(12) United States Patent
Kang et al.

(10) Patent No.: US 7,477,746 B2
(45) Date of Patent: Jan. 13, 2009

(54) APPARATUS FOR DYNAMICALLY MANAGING GROUP TRANSIENT KEY IN WIRELESS LOCAL AREA NETWORK SYSTEM AND METHOD THEREOF

(75) Inventors: You-Sung Kang, Daejon (KR); Kyunghee Oh, Seoul (KR); Byung-Ho Chung, Daejon (KR); Kyo-Il Chung, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 721 days.

(21) Appl. No.: 10/918,617

(22) Filed: Aug. 13, 2004

(65) Prior Publication Data
US 2005/0107081 A1    May 19, 2005

(30) Foreign Application Priority Data
Nov. 18, 2003    (KR) ...................... 10-2003-0081803

(51) Int. Cl.
*H04Q 7/20*    (2006.01)
(52) U.S. Cl. ...................... 380/270; 380/273; 380/274; 380/44; 455/422.1; 455/426.2
(58) Field of Classification Search .................. 380/270
See application file for complete search history.

(56) References Cited
U.S. PATENT DOCUMENTS
6,418,130 B1 *    7/2002    Cheng et al. ................ 370/331

6,892,230 B1 *    5/2005    Gu et al. ...................... 709/220

(Continued)

FOREIGN PATENT DOCUMENTS
KR        010008808 A    2/2001

(Continued)

OTHER PUBLICATIONS

Altunbasak, H., et al, 'Alternate Pair-wise Key Exchange Protocols for Robust Security Networks (IEEE 802.11i) in Wireless LANs', 2004, IEEE 0-7803-8367-204, entire document, http://ieeexplore.ieee.org/iel5/9051/28706/01287901.pdf?arnumber=1287901.*

(Continued)

*Primary Examiner*—Kristine Kincaid
*Assistant Examiner*—Ronald Baum
(74) *Attorney, Agent, or Firm*—Blakely, Sokoloff, Taylor & Zafman LLP

(57) ABSTRACT

An apparatus for dynamically managing a group transient key (GTK) and a method thereof in order to perform setting of a GTK successfully by an access point (AP). Wherein, the AP checks security state of a plurality of mobile stations (MS)s connecting to the AP, and exchanges and sets a GTK for authenticated MSs. The apparatus for managing a GTK in a wireless LAN system, the apparatus including: a GTK generation timing deciding unit for deciding timing to generate a GTK based on security state of an MS; a GTK generating unit for generating a GTK according to the GTK generation timing decided in the GTK generation timing deciding unit; a GTK exchanging unit for exchanging the GTK generated in the GTK generating unit based on the security state of the MS; and a GTK setting unit for setting the GTK based on the number of MSs exchanged the GTK.

4 Claims, 6 Drawing Sheets

U.S. PATENT DOCUMENTS 6,920,559 B1 * 7/2005 Nessett et al. ............... 713/168
7,103,359 B1 * 9/2006 Heinonen et al. ........... 455/436

FOREIGN PATENT DOCUMENTS

KR        20010090038 A     10/2001
KR     1020030050881 A     6/2003

OTHER PUBLICATIONS

Design of Accounting and Security Sessions for IEEE 802.11 Network.
LAN/MAN Specific Requirements-Part II : Wireless Medium Access Control and Physical Layer Specifications: Specification for Enhanced Security, IEEE P802.11i/D3.0, Nov. 2002, pp. 111-113.
Port-Based Network Access Control, IEEE Std 802.1X-2001, 2001, pp. 42-43.

* cited by examiner

APPARATUS FOR DYNAMICALLY MANAGING GROUP TRANSIENT KEY IN WIRELESS LOCAL AREA NETWORK SYSTEM AND METHOD THEREOF

FIELD OF THE INVENTION

The present invention relates to an apparatus for managing a group transient key (GTK) in a wireless local area network (LAN) system and a method thereof; and more particularly, to an apparatus for managing a GTK in order to set the GTK successfully by checking security state of plural mobile stations (MS)s connected to an access point (AP), exchanging and setting the GTK after authentication of each terminal at the AP, and a method thereof.

DESCRIPTION OF RELATED ART

A mobile station (MS) means a terminal having a wireless LAN card and telecommunicating in a wireless LAN system, e. g, a laptop, a personal digital assistant (PDA), etc.

Mixed mode wireless LAN environment means a wireless LAN system including an access point (AP) communicating with various MSs, which use various authentication, key exchange and encryption algorithms.

Core of a conventional security mechanism of an MS standardized by Institute of Electrical and Electronics Engineers 802.11 (IEEE 802.11) is a Wired Equivalent Privacy algorithm (WEP).

FIG. 1 is a block diagram showing a conventional wireless LAN system based on the WEP.

As shown, in the wireless LAN system based on the WEP, a mobile station (MS) 101 is connected to an access point (AP) 102 in order to use Internet 104. Wherein, the WEP is used in communication between the MS 101 and the AP 102, and a pre-shared key of them 101, 102 is used as a WEP key. In this case, the communication among MSs can be disclosed to other MSs which know the shared key.

Also, the WEP is weak for "known plaintext attack" due to its own design defect.

Therefore, Wireless-Fidelity Alliance (Wi-Fi) defines an internal standard for security in a wireless LAN system as Wi-Fi Protected Access (WPA) and test for mutual compatibility.

Representative authentication and key exchange mechanisms are IEEE 802.1X and IEEE 802.11i, and representative encryption algorithm in the wireless LAN system is Temporal Key Integrity Protocol (TKIP).

FIG. 2 is a diagram illustrating a wireless LAN system to which the present invention is applied.

The wireless LAN system includes plural mobile stations (MS)s 201, an access point (AP) 202 and an authentication server 205. The MS 201 is connected to Internet 204 through the AP 202. Wherein, for a secure communication between the MS 201 and the AP 202, IEEE 802.1X or Pre-shared Key (PSK) authentication is applied as an authentication algorithm, and the WEP or the TKIP is applied as an encryption algorithm, and an encryption key is set in both of them 201, 202 after a key exchange.

Meanwhile, the wireless LAN system applied to the present invention can be a mixed mode wireless LAN system supporting the WEP and the TKIP at the same time.

Wherein, the mixed mode means that the AP 202 supports simultaneously both of the MS 201 based on the WEP and the MS 201 based on the TKIP. In the mixed mode wireless LAN system, one of IEEE 802.1X or IEEE 802.11i is used for key exchange in accordance with each encryption algorithm.

The IEEE 802.1X key exchange algorithm is a known art disclosed in IEEE 802.1X Port-Based Network Access Control document as international technology standard document, and the IEEE 802.11i is also disclosed in IEEE 802.11i draft 3.0 document. Accordingly, for only easy description, detailed description on IEEE 802.1X and IEEE 802.11i will be skipped.

As above-mentioned, in the wireless LAN system having plural MSs, when plural MSs 201 is connected to one AP, the AP 202 has to carry out authentication and apply a key exchange algorithm and an encryption algorithm to each MS 201.

However, if a conventional AP is used in mixed mode wireless LAN, there is a drawback that the AP cannot determine timing for generating a group transient key (GTK) because security state of MSs is not defined clearly, such that the AP cannot generate a GTK.

Also, in the conventional method, there is a drawback as follows. The AP may recognize an MS as being not authenticated although the MS is authenticated. The MS will not be included in the GTK exchange target list and can not exchange GTK.

In the conventional mixed mode, there is another drawback as followings. If the AP includes the MS which failed authentication after connecting to the AP on the GTK exchange target list, the AP cannot exchange a GTK with all of the MSs, such that the AP fails to set a GTK.

SUMMARY OF THE INVENTION

It is, therefore, an object of the present invention to provide an apparatus for dynamically managing a group transient key (GTK) and a method thereof in order to perform setting of a GTK successfully by an access point (AP). Wherein, the AP checks security state of plural mobile stations (MS)s connecting to the AP, and exchanges and sets a GTK for authenticated MSs.

In accordance with an aspect of the present invention, there is provided an apparatus for managing a group transient key (GTK) in a wireless local area network (LAN) system, the apparatus including: a GTK generation timing deciding unit for deciding timing to generate a GTK based on security state of a mobile station; a GTK generating unit for generating a GTK in accordance with the GTK generation timing decided in the GTK generation timing deciding unit; a GTK exchanging unit for exchanging the GTK generated in the GTK generating unit based on the security state of the mobile station; and a GTK setting unit for setting the GTK based on the number of mobile stations which exchanged the GTK.

In accordance with another aspect of the present invention, there is provided a method for managing a group transient key (GTK) in a wireless local area network (LAN) system, the method including the steps of: a) at a GTK generation timing deciding unit, deciding a timing to generate a GTK of a mobile station connected to a access point (AP); b) at a GTK generating unit, generating a GTK in accordance with the GTK generation timing decided in the GTK generation timing deciding unit; c) at a GTK exchanging unit, exchanging the GTK with the mobile station; and d) at a GTK setting unit, setting the GTK after completing of the GTK exchange in the GTK exchanging unit.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
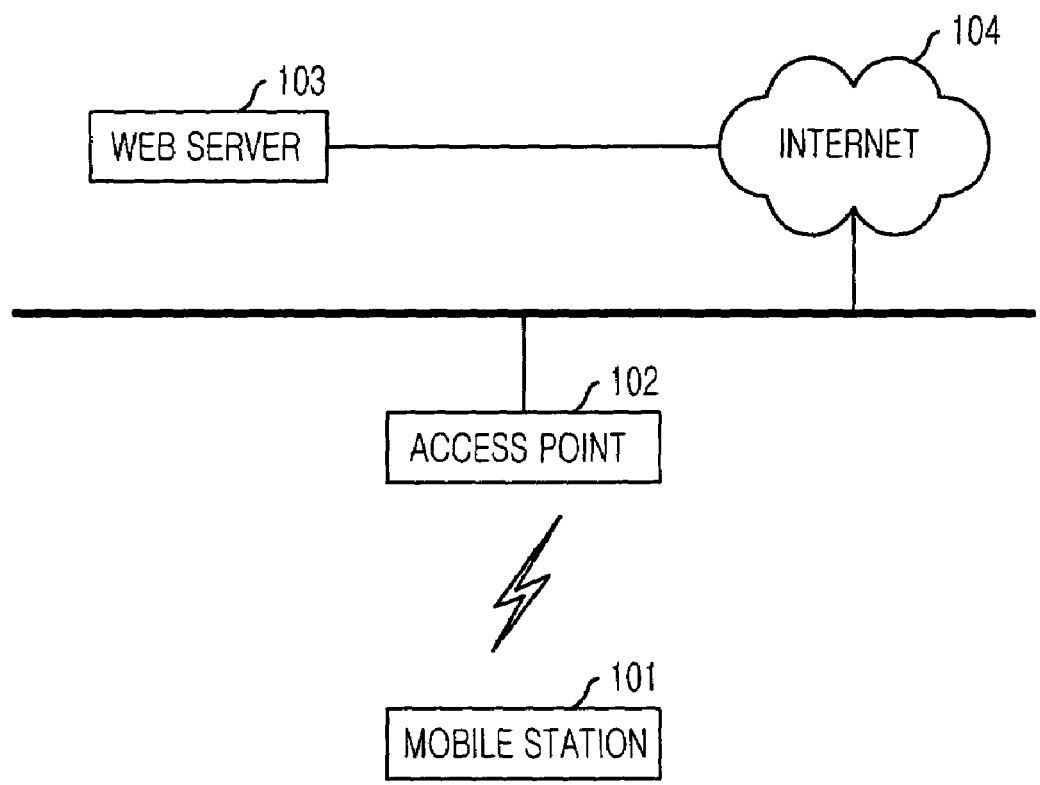
FIG. 1 is a block diagram showing a conventional wireless local area network (LAN) system based on a WEP.
Figure 2:
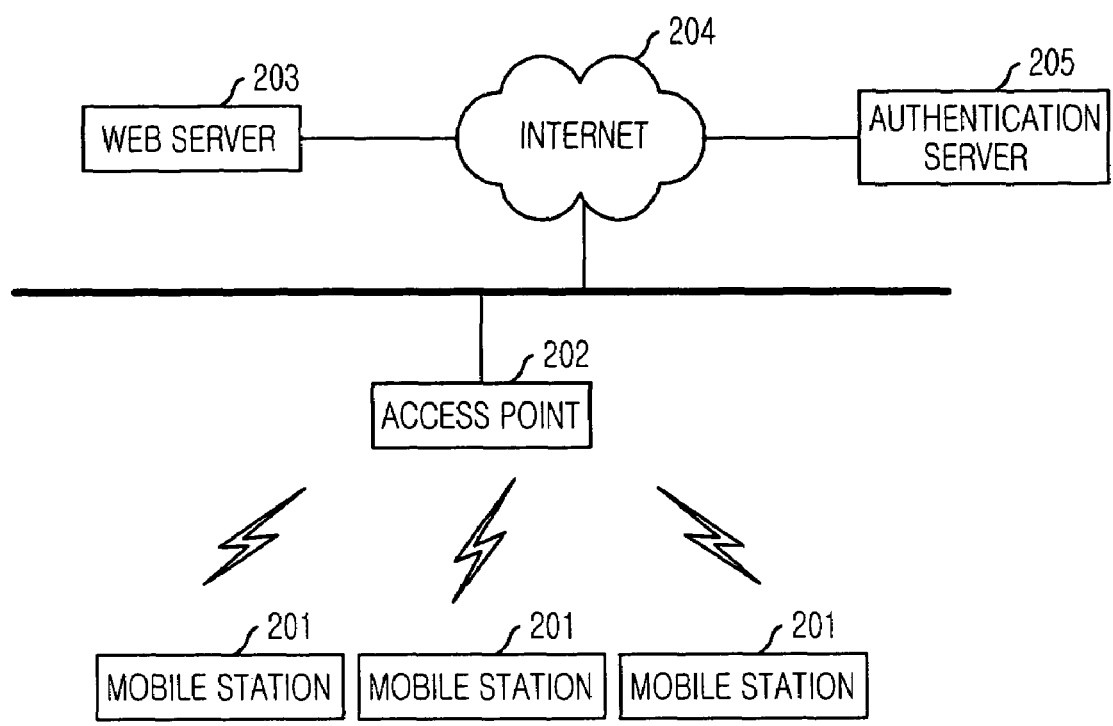
FIG. 2 is a block diagram illustrating a wireless LAN system to which the present invention is applied.
Figure 3:
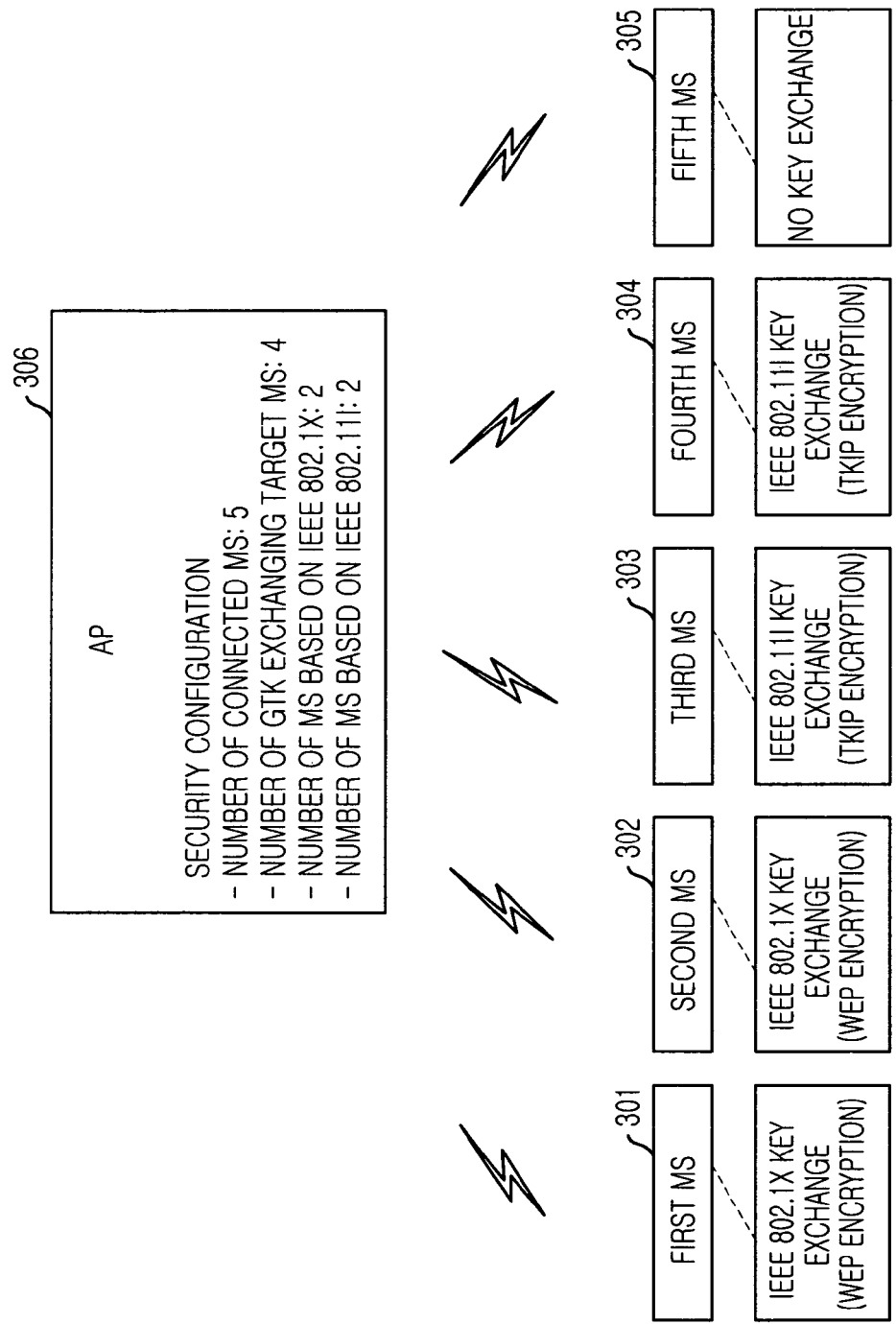
FIG. 3 is a diagram describing status for checking a security state of a mobile station (MS) connected to a mixed mode access point (AP) in accordance with an embodiment of the present invention.

FIG. 3 is a diagram describing status to check security state of a mobile station (MS) connected to a mixed mode access point (AP) in accordance with an embodiment of the present invention.

As shown, MSs 301, 302, 303, 304 and 305 are connected to the AP 306. The AP 306 checks the number of MSs currently connected, the number of target MSs which exchanges a GTK and what kinds of key exchange algorithm is used for each MS.

Therefore, the AP 306 checks the security state of the MSs that a first MS 301 and a second MS 302 are based on IEEE 802.1X, and a third MS 303 and a fourth MS 304 are based on IEEE 802.11i.

Also, the AP 306 checks that a fifth MS 305 doesn't support key exchange, and excludes the fifth MS 305 from the GTK exchange target list.

Then, in a process of key exchange, if an MS exchanges a GTK successfully, the AP 306 excludes the MS which exchanged the GTK from the GTK exchange target list, and exchanges repeatedly the GTK with total target MSs. If the number of the target MS becomes 0, the AP 306 carries out setting of the GTK.

Figure 4:
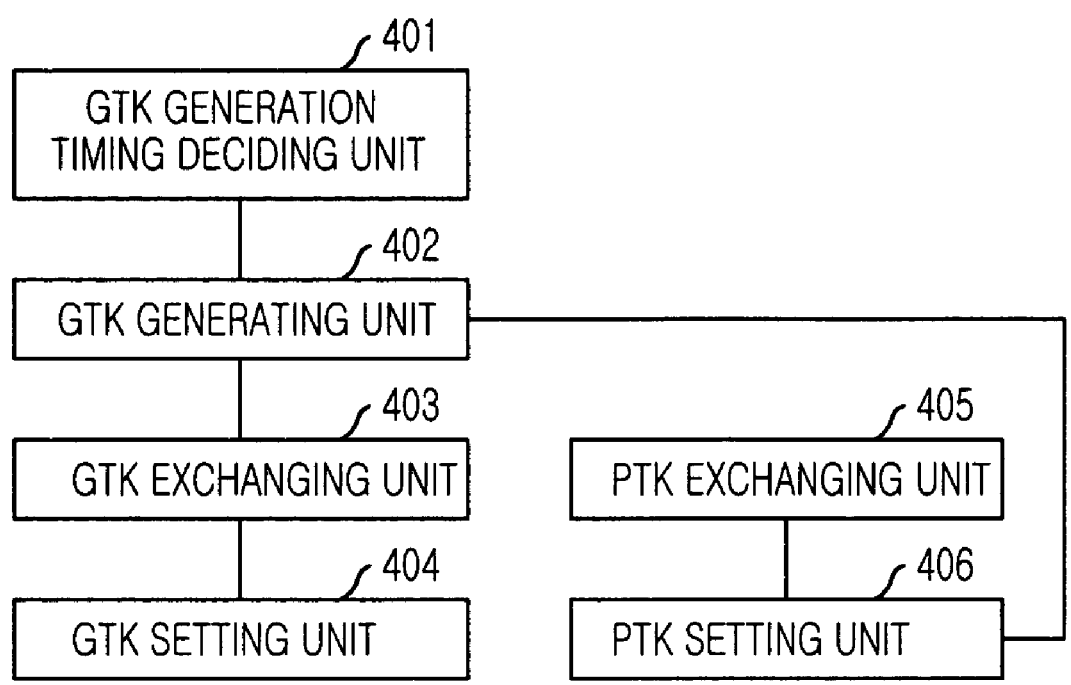
FIG. 4 is a block diagram showing an apparatus for dynamically managing a group transient key (GTK) in accordance with an embodiment of the present invention.

FIG. 4 is a block diagram showing an apparatus for dynamically managing a group transient key (GTK) in accordance with an embodiment of the present invention.

The apparatus for dynamically managing a GTK in accordance with the present invention includes a GTK generation timing deciding unit 401 for deciding timing to generate a GTK based on security state of a mobile station (MS), a GTK generating unit 402 for generating a GTK with respect to the timing decided in the GTK generation timing deciding unit 401, a GTK exchanging unit 403 for exchanging the GTK generated in the GTK generating unit 402, a GTK setting unit 404 for setting the GTK based on the number of MSs which exchanged the GTK with an AP, a pairwise transient key (PTK) exchanging unit 405 and a PTK setting unit 406. Wherein, the apparatus in accordance with the present invention is embedded in the AP.

The detail description of the units is described as following.

The GTK generation timing deciding unit 401 checks security state of each MS and decides timing to generate a GTK. If there is an MS based on IEEE 802.1X, the GTK generation timing deciding unit 401 decides GTK generation timing as the present time. If there is an MS based on IEEE 802.11i only, the GTK generation timing deciding unit 401 decides GTK generation timing with 'later'. Wherein, 'later' means a point of time after following processes. The first MS based on IEEE 802.11i is authenticated successfully. Then, the MS exchanges and sets a pairwise transient key (PTK) with the AP. The AP includes the MS on GTK exchange target list.

Meanwhile, the GTK generating unit 402 generates a GTK at timing decided in the GTK generation timing deciding unit 401. If the MS is based on IEEE 802.11i, a PTK is required to generate a GTK. Therefore, after exchanging a PTK in the PTK exchanging unit 405 and setting the PTK in the PTK setting unit 406, the GTK generating unit 402 generates a GTK.

The GTK exchanging unit 403 exchanges the GTK with respect to a GTK exchanging target list.

The GTK setting unit 404 sets the GTK when the number of MSs in the GTK exchanging target list becomes '0'.

Meanwhile, the PTK exchanging unit 405 exchanges a PTK in accordance with security state of each MS connected to the AP 306. The PTK setting unit 406 sets the PTKs for each MS.

Figure 5:
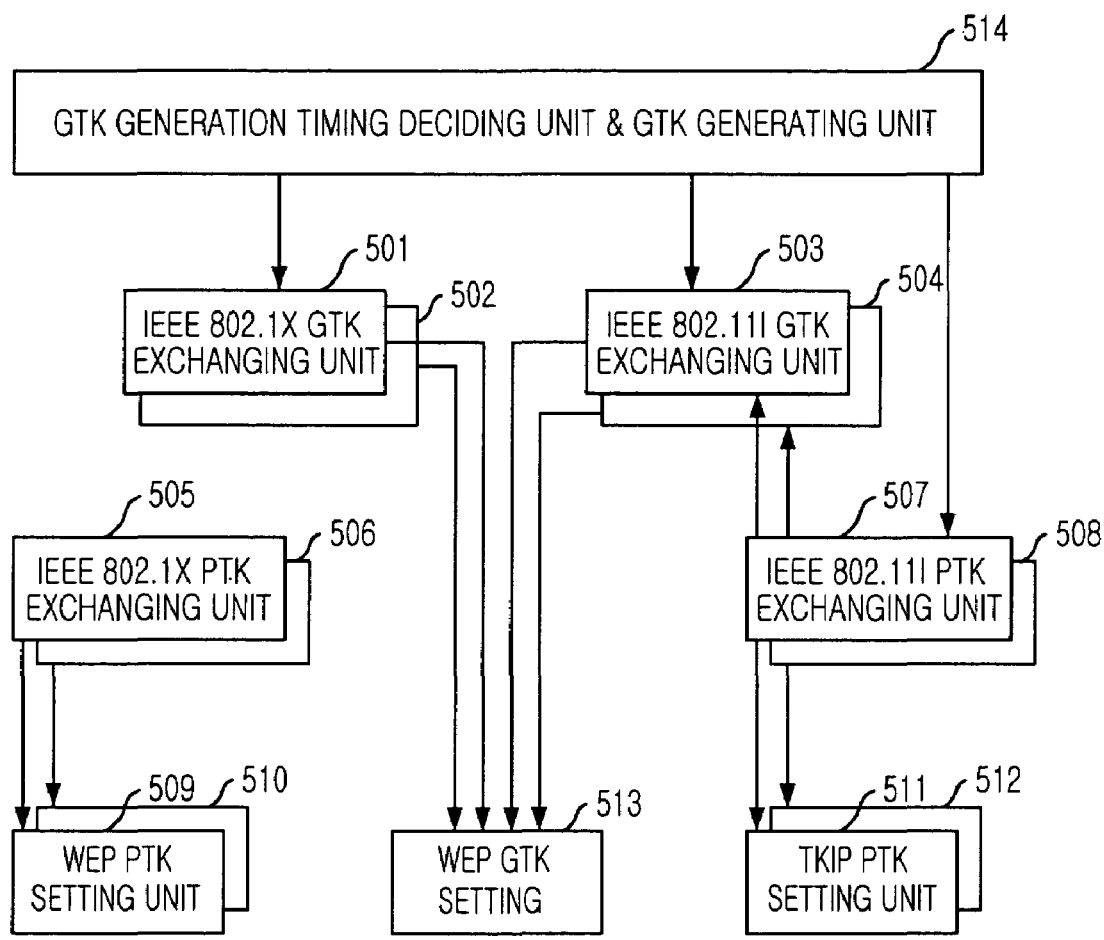
FIG. 5 is a process diagram describing an apparatus for dynamically managing a GTK in accordance with an embodiment of the present invention.

FIG. 5 is a diagram describing process of an apparatus for dynamically managing a GTK in accordance with an embodiment of the present invention.

Referring to FIGS. 3 and 5, the AP 306 in the mixed mode wireless LAN system, the GTK generation timing deciding unit and GTK generating unit 514 decides GTK generation timing as the present time and generates a GTK because the MS based on IEEE 802.1X exists in the system.

Meanwhile, for the first MS 301 and the second MS 302, the IEEE 802.1X PTK exchanging units 505, 506 exchange each PTK, and the WEP PTK setting units 509, 510 set each PTK.

Then, IEEE 802.1X GTK exchanging units 501, 502 receive the GTK from the GTK generating unit 514 and exchanging the GTK with the first and second MSs 301, 302. After exchanging the GTK, the IEEE 802.1X GTK exchanging units 501, 502 report completion of key exchange to the WEP GTK setting unit 513.

Meanwhile, for the third MS 303 and the fourth MS 304, IEEE 802.11i GTK exchanging units 507, 508 exchange each PTK, and the TKIP PTK setting units 511, 512 set each PTK. Then, IEEE 802.11i GTK exchanging units 503, 504 receive the GTK and exchange the GTK with the third and fourth MSs 303, 304. After exchanging the GTK, the IEEE 802.11i GTK exchanging units 503, 504 report completion of key exchange to the WEP GTK setting unit 513.

Then, the WEP GTK setting unit 513 sets the WEP GTK based on the number of the GTK exchanging target MSs and related parameters.

Figure 6:
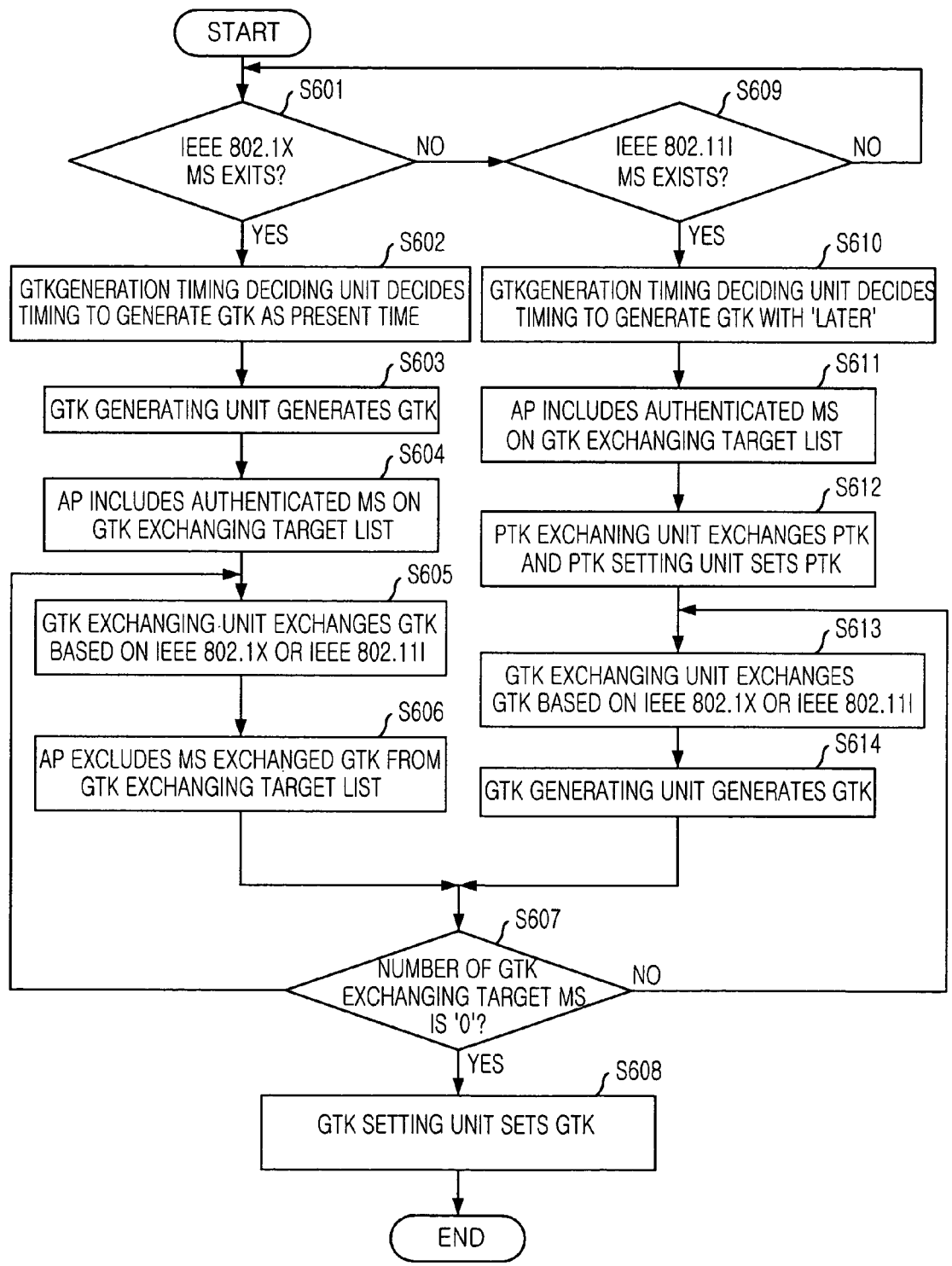
FIG. 6 is a flowchart illustrating a method for dynamically managing a GTK in wireless LAN system in accordance with an embodiment of the present invention.

FIG. 6 is a flowchart illustrating a method for dynamically managing a GTK in wireless LAN system in accordance with an embodiment of the present invention.

The AP 306 checks whether an MS based on IEEE 802.1X exists or not, at step S601.

If there is an MS based on IEEE 802.1X, the GTK generation timing deciding unit 401 decides timing to generate a GTK as the present time, at step S602. Then, the GTK generating unit 402 generates a GTK, at step S603.

The AP 202 checks results of authentication between each MS and the authentication server 205, and includes only the authenticated MS on the GTK exchanging target list, at step S604.

Then, the GTK exchanging unit 403 exchanges the GTK with each MS based on IEEE 802.1X or IEEE 802.11i in accordance with the security state, at step S605. After exchanging the GTK, the GTK exchanging unit 403 excludes the MS, which exchanged the GTK successfully, at step S606.

Then, the AP 202 checks the number of the GTK exchanging target MSs, at step S607. If the number of the GTK exchanging target MSs is '0', the GTK setting unit 404 sets the GTK based on the security state, and terminates the GTK setting process, at step S608. If the number of the GTK exchanging target number is not '0', the GTK exchanging unit 403 exchanges the GTK with each MS, at steps S605 or S613.

Meanwhile, at step S601, if there is no MS based on IEEE 802.1X, the AP 202 checks whether an MS based on IEEE 802.11i exits or not, at step S609. If there is no MS based on IEEE 802.11i, the AP 202 waits the connection of the MS based on key exchange algorithm. If an MS based on IEEE 802.11i exists in the system, the GTK generation timing deciding unit 401 decides timing to generate a GTK with 'later', at step S610.

Then, the AP 202 includes the MS authenticated by the authentication server 205, on the GTK exchanging target list, at step S611.

The PTK exchanging unit 404 exchanges a PTK with the detected MS at step S609 based on IEEE 802.11i, and the PTK setting unit 405 sets the PTK based on the security configuration, at step S612.

The GTK exchanging unit 403 exchanges the GTK with each MS based on IEEE 802.11i, at step S613.

The GTK generating unit generates a GTK based on the security configuration, at step S614. Then, the process after steps S614 continues to the step S607.

As above-mentioned, the method of the present invention can be embodied as a program and stored in recording media readable by a computer, e.g., CD-ROM, RAM, floppy disk, hard disk, magneto-optical disk, etc.

The present invention provides method that performs GTK setting successfully in the mixed mode wireless LAN system. According to the method, the AP applies a dynamic GTK management method based on security state of MSs and decides whether an MS is a GTK exchanging target MS or not after the MS is authenticated.

Also, the present invention provides an AP applied to a dynamic GTK exchanging method based on security state of the MSs in the mixed mode wireless LAN system so that constitutes a stable security channel, and furthermore, promotes the use of high speed wireless Internet.

The present application contains subject matter related to Korean patent application no. 2003-81803, filed in the Korean intellectual Property Office on Nov. 18, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for managing a group transient key (GTK) in a wireless local area network (LAN) system, the apparatus comprising:
   a GTK generation timing deciding means for determining a time to generate a GTK based on a security state of a mobile station;
   a GTK generating means for generating a GTK in accordance with the time determined by the GTK generation timing deciding means;
   a GTK exchanging means for exchanging the GTK generated by the GTK generating means with the mobile station based on the security state of the mobile station; and
   a GTK setting means for setting the GTK after the GTK is exchanged with the mobile station.

2. A method for managing a group transient key (GTK) in a wireless local area network (LAN) system, the method comprising the steps of:
   a) determining a time to generate a GTK of a mobile station connected to an access point (AP), wherein the time is determined based on a security state of the mobile station;
   b) generating a GTK in accordance with the time;
   c) exchanging the GTK with the mobile station based on the security state of the mobile station; and
   d) setting the GTK after completing the GTK exchange.

3. The method as recited in claim 2, wherein the step a) includes the steps of:
   if the mobile station requests an institute of electrical and electronics engineers (IEEE) 802.1X key exchange, determining the time as a present time;
   if the mobile station does not request an IEEE 802.1X key exchange and the mobile station requests an IEEE 802.11i key exchange, determining the time as a point of time after the following occurs:
   the mobile station requesting IEEE 802.11i key exchange to an access point is successfully authenticated;
   the successfully authenticated mobile station is included on a GTK exchanging target list; and
   a pairwise transient key (PTK) exchange between the mobile station and the access point is successfully completed, wherein the mobile station is identified by the GTK exchanging target list;
   else waiting for a request from the mobile station.

4. The method as recited in claim 2, wherein the step c) further comprises:
   determining whether the mobile station is authenticated;
   adding the mobile station to a GTK exchanging target list if the mobile station is authenticated; and
   exchanging the GTK with the mobile station if the mobile station is on the GTK exchanging target list.

* * * * *